United States Patent
Gahagan (10) Patent No.: US 10,723,104 B2
(45) Date of Patent: Jul. 28, 2020

(54) LIGHT-RESPONSIVE THIN GLASS LAMINATES

(71) Applicant: CORNING INCORPORATED, Corning, NY (US)

(72) Inventor: Kevin Thomas Gahagan, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 211 days.

(21) Appl. No.: 15/578,385

(22) PCT Filed: Jun. 1, 2016

(86) PCT No.: PCT/US2016/035130
§ 371 (c)(1),
(2) Date: Nov. 30, 2017

(87) PCT Pub. No.: WO2016/196531
PCT Pub. Date: Dec. 8, 2016

(65) Prior Publication Data
US 2018/0215125 A1  Aug. 2, 2018

Related U.S. Application Data

(60) Provisional application No. 62/169,755, filed on Jun. 2, 2015.

(51) Int. Cl.
*B32B 17/10* (2006.01)
*C03C 21/00* (2006.01)

(52) U.S. Cl.
CPC .. *B32B 17/10495* (2013.01); *B32B 17/10036* (2013.01); *B32B 17/1077* (2013.01);
(Continued)

(58) Field of Classification Search
CPC ........ B32B 17/10495; B32B 17/10504; B32B 17/10431; B32B 17/10036;
(Continued)

(56) References Cited

U.S. PATENT DOCUMENTS 4,668,270 A  5/1987  Ramus
5,023,209 A  6/1991  Grateau et al.
(Continued)

FOREIGN PATENT DOCUMENTS

DE  102007037891 A1  2/2009
WO  9411779  † 5/1994
(Continued)

OTHER PUBLICATIONS

International Search Report and Written Opinion of the International Searching Authority; PCT/US2016/035130 dated Sep. 16, 2016; 11 Pages; European Patent Office.
(Continued)

*Primary Examiner* — Ruiyun Zhang (57) ABSTRACT

Embodiments of this disclosure pertain to a laminate including a first substrate, an interlayer and a light responsive material disposed on the first substrate, and a second substrate disposed on the interlayer. The laminate may be complexly curved. The light responsive material may include any one or more of an electrochromic material, a photochromic material, a suspended particle material, a micro-blind material and a liquid crystal material. In one or more embodiments, the laminate comprises a display unit disposed between the first and second substrate. Methods for forming the laminate are also disclosed.

20 Claims, 4 Drawing Sheets

(52) U.S. Cl.
CPC .. *B32B 17/10119* (2013.01); *B32B 17/10137* (2013.01); *B32B 17/10486* (2013.01); *B32B 17/10504* (2013.01); *B32B 17/10513* (2013.01); *B32B 17/10532* (2013.01); *B32B 17/10743* (2013.01); *B32B 17/10752* (2013.01); *B32B 17/10761* (2013.01); *B32B 17/10788* (2013.01); *B32B 17/10935* (2013.01); *B32B 2329/06* (2013.01); *B32B 2331/04* (2013.01); *B32B 2369/00* (2013.01); *B32B 2375/00* (2013.01); *B32B 2457/20* (2013.01); *B32B 2457/202* (2013.01); *B32B 2457/204* (2013.01); *B32B 2457/206* (2013.01); *C03C 21/002* (2013.01); *Y10T 428/1059* (2015.01); *Y10T 428/1077* (2015.01); *Y10T 428/1082* (2015.01)

(58) Field of Classification Search
CPC ......... B32B 17/10119; B32B 17/10137; B32B 17/10486; B32B 17/10513; B32B 17/10532; B32B 17/10743; B32B 17/10752; B32B 17/10761; B32B 17/1077; B32B 17/1078; B32B 2329/06; B32B 2329/04; B32B 2369/00; B32B 2375/00; B32B 2457/202; B32B 2457/204; B32B 2457/206; Y10T 428/1059; Y10T 428/1077; Y10T 428/1082
USPC ......... 428/1.5, 1.54, 1.1, 172, 179; 156/109, 156/99, 60; 65/105; 349/155, 158
See application file for complete search history.

(56) References Cited

U.S. PATENT DOCUMENTS

| | | | |
|---|---|---|---|
| 5,598,293 | A | 1/1997 | Green |
| 6,039,390 | A | 3/2000 | Agrawal et al. |
| 6,261,398 | B1 † | 7/2001 | Costa |
| 6,266,123 | B1 † | 7/2001 | Maejima |
| 6,577,355 | B1 | 6/2003 | Yaniv |
| 8,576,370 | B1 * | 11/2013 | Sampica ............... G02F 1/1335 349/155 |
| 8,629,903 | B2 | 1/2014 | Seder et al. |
| 8,986,072 | B2 | 3/2015 | Darcangelo et al. |
| 9,261,752 | B2 | 2/2016 | Moskowitz |
| 10,358,087 | B2 | 7/2019 | Kurihara |
| 2005/0084659 | A1 | 4/2005 | Dunkel |
| 2006/0098153 | A1 † | 5/2006 | Slikkerveer |
| 2009/0219468 | A1 | 9/2009 | Barton et al. |
| 2012/0094084 | A1 | 4/2012 | Fisher et al. |
| 2012/0194974 | A1 † | 8/2012 | Weber |
| 2012/0328843 | A1 | 12/2012 | Cleary et al. |
| 2013/0086948 | A1 | 4/2013 | Bisson et al. |
| 2013/0125589 | A1 | 5/2013 | Dannoux et al. |
| 2013/0125592 | A1 | 5/2013 | Bisson |
| 2013/0127202 | A1 | 5/2013 | Hart |
| 2013/0295357 | A1 | 11/2013 | Cleary et al. |
| 2013/0319046 | A1 | 12/2013 | Cleary et al. |
| 2013/0323415 | A1 | 12/2013 | Brackley et al. |
| 2014/0055834 | A1 | 2/2014 | Yan |
| 2014/0087159 | A1 | 3/2014 | Cleary et al. |
| 2014/0087193 | A1 | 3/2014 | Cites et al. |
| 2014/0141217 | A1 | 5/2014 | Gulati et al. |
| 2014/0204294 | A1 | 7/2014 | Lv |
| 2014/0239034 | A1 | 8/2014 | Cleary et al. |
| 2014/0356604 | A1 | 12/2014 | Borrelli et al. |
| 2015/0064374 | A1 | 3/2015 | Jain et al. |
| 2015/0111016 | A1 | 4/2015 | Fisher et al. |
| 2015/0122406 | A1 | 5/2015 | Fisher et al. |
| 2015/0132538 | A1 | 5/2015 | Cleary et al. |
| 2015/0138614 | A1 | 5/2015 | Rossini |
| 2015/0140301 | A1 | 5/2015 | Fisher et al. |
| 2015/0158275 | A1 | 6/2015 | D'Errico et al. |
| 2015/0158277 | A1 | 6/2015 | Fisher et al. |
| 2015/0232366 | A1 | 8/2015 | Fredholm et al. |
| 2015/0232367 | A1 | 8/2015 | Joubaud et al. |
| 2015/0251377 | A1 | 9/2015 | Cleary et al. |
| 2015/0274571 | A1 | 10/2015 | Brennan et al. |
| 2015/0321940 | A1 | 11/2015 | Dannoux et al. |
| 2016/0075111 | A1 * | 3/2016 | Dixon ............... B32B 17/10036 428/172 |
| 2016/0082705 | A1 | 3/2016 | Fisher et al. |
| 2016/0086305 | A1 | 3/2016 | Watanabe |
| 2016/0145139 | A1 | 5/2016 | Fredholm et al. |
| 2016/0207819 | A1 | 7/2016 | Cleary et al. |
| 2016/0207820 | A1 | 7/2016 | Cleary et al. |
| 2016/0250825 | A1 | 9/2016 | Cleary et al. |

FOREIGN PATENT DOCUMENTS

| | | | |
|---|---|---|---|
| WO | 2014174308 | A1 | 10/2014 |
| WO | 2015006201 | A1 | 1/2015 |
| WO | 2015031594 | A2 | 3/2015 |

OTHER PUBLICATIONS

English Translation of JP2017562618 Office Action dated Apr. 1, 2020; 4 Pages; Japanese Patent Office; Translated From Global Dossier.
PPG, CR-39 Product Bulletin, 5 pages, Apr. 20, 2006, US https://refractiveindex.info/download/data/2006/CR39.pdf.†
Corning, Gorilla Glass specification, 2 pages, Jul. 2016, US https://www.corning.com/microsites/csm/gorillaglass/PI_Sheets/Corning%20Gorilla%20Glass%205%20PI%20Sheet.pdf.†

* cited by examiner
† cited by third party

LIGHT-RESPONSIVE THIN GLASS LAMINATES

CROSS-REFERENCE TO RELATED APPLICATIONS

This application is a national stage entry of International Patent Application Serial No. PCT/US16/35130 filed on Jun. 1, 2016, which claims the benefit of priority under 35 U.S.C. § 119 of U.S. Provisional Application Ser. No. 62/169,755 filed on Jun. 2, 2015, the content of which is relied upon and incorporated herein by reference in its entirety.

BACKGROUND

The disclosure relates thin laminates exhibiting light response functionality, and more particularly to thin laminates that exhibit both light responsiveness and incorporate a display unit.

Laminates are often utilized as windows and glazing in architectural and vehicle or transportation applications, including automobiles, rolling stock, locomotive and airplanes. Such laminates can also be used as glass panels in balustrades and stairs, and as decorative panels or coverings for walls, columns, elevator cabs, household and industrial appliances and other applications. The laminates can be a transparent, semi-transparent, translucent or opaque part of a window, panel, wall, enclosure, sign or other structure. Common types of laminates are used in architectural and/or vehicular applications include clear and tinted laminated glass structures.

Conventional laminate constructions typically used in automotive applications include two plies of 2 mm soda lime glass with a polyvinyl butyral (PVB) interlayer. Such laminates exhibit limited impact resistance and higher weight. Moreover, these laminates exhibit poor performance characteristics, including a higher probability of breakage when struck by roadside debris, vandals and other objects of impact as well as lower fuel efficiencies for a respective vehicle. Known laminates often exhibit inferior optical properties and do not incorporate light response functionality or display technologies. Accordingly, there is a need for laminates that are thin and lightweight, which also exhibit light responsiveness, incorporate display units and can be formed into complexly curved shapes.

SUMMARY

A first aspect of this disclosure pertains to a laminate comprising a first substrate, an interlayer and a light responsive material disposed on the first substrate, and a second substrate disposed on the interlayer and the light responsive material. In some embodiments, the laminate is complexly curved. The laminate of one or more embodiments may include a curved first substrate, a substantially planar second substrate, at least one interlayer and at least one light responsive material (which may be provided as a separate layer or incorporated into the interlayer) intermediate the first and second substrates, wherein the second substrate is cold formed to the curvature of the first substrate. In some embodiments, the light responsive material is integral to one or both of the first and second substrates.

In some instances, the light responsive material includes an electrochromic material, a photochromic material, a suspended particle material, a micro-blind material, a liquid crystal material or a combination thereof. In some instances, the laminate includes a display unit disposed between the first and second substrate, a display unit integrally formed in one or both the first and second substrate, or a display unit disposed behind the laminate with respect to the viewer or user. The display unit includes an image panel that can include any one or more of a micro-LED array, an OLED array, a LCD array, a plasma cell array, and an electroluminescent (EL) cell array.

In one or more embodiments, the interlayer may include a polymer. In some instances, the interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof. The interlayer may have a thickness of less than about 1 mm.

The first substrate, the second substrate or both the first and the second substrate may be strengthened. In some instances, the first substrate includes first and second surfaces, with the second surface being adjacent the interlayer, and the second substrate comprises third and fourth surfaces, the third surface being adjacent the interlayer and the fourth surface being opposite the third surface. The first surface of the laminate may include a surface compressive stress of greater than about 200 MPa and a depth of layer of compressive stress of greater than about 30 μm.

In some embodiments, wherein either one or both the first and second substrate comprise a thickness of about 1.5 mm or less. Where a substrate is strengthened, such substrate includes a thickness of about 1.0 mm or less.

The laminate of one or more embodiments may be incorporated into an article such as a vehicle, an architectural fixture, an architectural structure, an appliance a consumer electronic device, furniture, an information kiosk, and a retail kiosk.

A second aspect of this disclosure includes a method of forming a laminate. The method of one or more embodiments includes providing a first substrate and a second substrate, laminating the first and second substrates to at least one interlayer and at least one light responsive material to form a laminate such that the interlayer and the light responsive material are disposed between the first and second substrate, and shaping the laminate to a complex curved shape. In some embodiments, the method includes providing a first substrate and a second substrate, wherein one or both substrates include at least one light responsive material, laminating the first and second substrates to at least one interlayer to form a laminate such that the interlayer and the light responsive material are disposed between the first and second substrate, and shaping the laminate to a complex curved shape. In some embodiments, the method includes strengthening one or both substrates prior to laminating. In some instances, strengthening one or both of the first and second substrates comprises chemically strengthening, thermally strengthening or chemically and thermally strengthening. In some embodiments, the method includes disposing a display unit between the first and second substrate, integrally forming a display unit in one or both the first and second substrate or disposing the display unit behind the laminate, with respect to the viewer.

A third aspect of this disclosure pertains to a method of cold forming a laminate that includes providing a curved first substrate, a substantially planar second substrate, at least one polymer interlayer and at least one light responsive layer between the first and second substrate, and laminating the first substrate, second substrate, polymer interlayer and light responsive material together at a temperature less than the softening temperature of the first and second substrates to provide a complexly curved laminate. In some embodiments, the method of cold forming a laminate includes providing a curved first substrate, a substantially planar second substrate, shaping the second substrate to the curved first substrate at a temperature less than the softening temperature of the first and second substrates to provide two complexly curved substrates, and laminating the first and second substrates to a polymer interlayer and a light responsive material. In some instances, the method of cold forming a laminate includes providing a curved first substrate and a substantially planar second substrate, wherein one or both the substrates includes a light responsive material, and laminating the first substrate and second substrate to a polymer interlayer at a temperature less than the softening temperature of the first and second substrates to provide a complexly curved laminate. In some embodiments, laminating the substrates and layers together provides Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments, examples of which are illustrated in the accompanying drawings.

Figure 1:
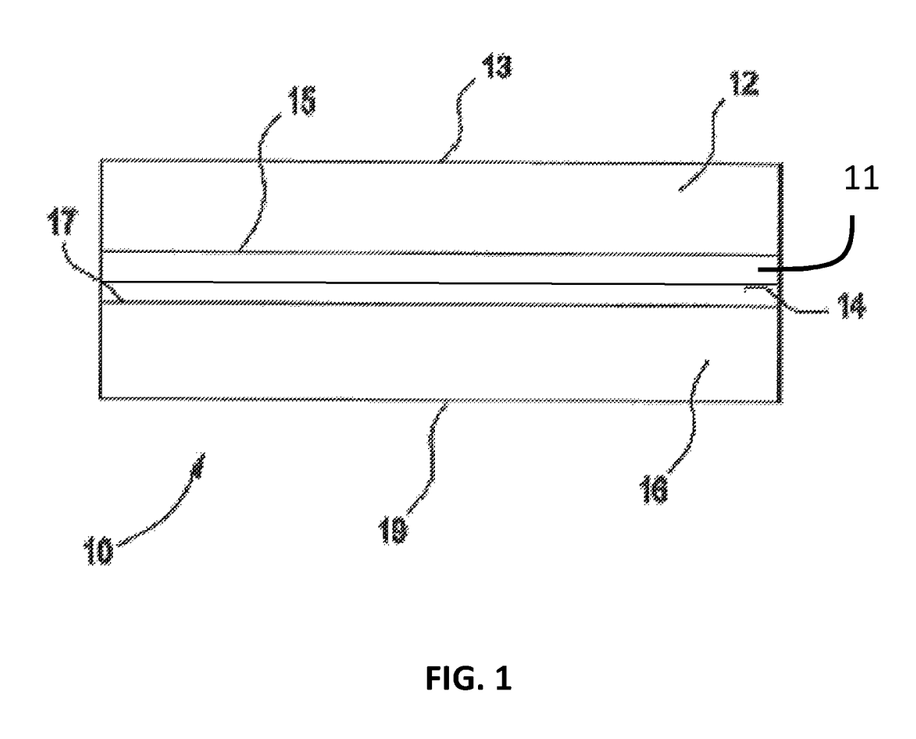
FIG. 1 is a side view of a laminate according to one or more embodiments.
Figure 2:
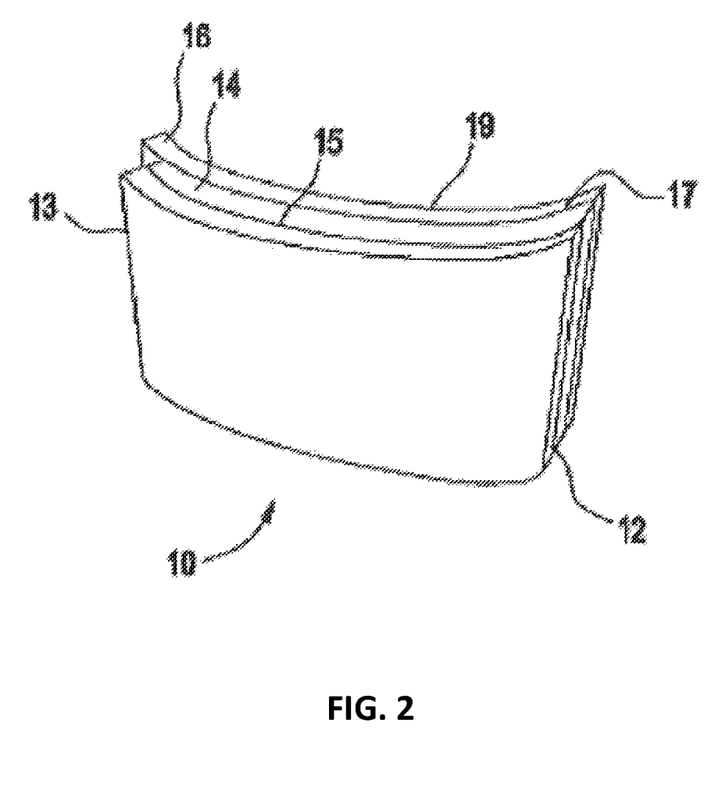
FIG. 2 is a perspective view of the laminate shown in FIG. 1.

A first aspect of this disclosure pertains to laminates comprising first and second substrates and at least one interlayer and a light responsive material disposed between the substrates. As shown in FIGS. 1 and 2, the laminate 10 includes a first substrate 12 and a second substrate 16, which include an interlayer 14 and a light responsive material 11 disposed between the first substrate and the second substrate. The first substrate includes a first surface 13, a second surface 15. The second substrate includes a third surface 17 and a fourth surface 19. In the embodiment shown, the light responsive material is a separate layer from the interlayer 14; however, the light responsive material may be incorporated in the interlayer or may be integrally formed to one or both substrates.

As used herein, "integral" or "integrally formed" may be used interchangeably and when used with respect to a material, excludes a separate layer and includes embedding the material into a substrate or layer or otherwise batching the material into the substrate or layer before forming the substrate or layer. When "integral" or "integrally formed" are used with respect to a display unit, the display unit is not a separate unit but is, instead, embedded into a substrate or layer of the laminate.

As used herein, a "layer" refers to a material portion including a region having a substantially uniform thickness. A layer may extend over the entirety of an underlying or overlying structure, or may have an extent less than the extent of an underlying or overlying structure. Further, a layer may be a region of a homogeneous or inhomogeneous contiguous structure that has a thickness less than the thickness of the contiguous structure. For example, a layer may be located between any pair of horizontal planes between, or at, a top surface and a bottom surface of the contiguous structure. A layer may extend horizontally, vertically, and/or along a tapered surface. A substrate may be a layer, may include one or more layers therein, or may have one or more layer thereupon, thereabove, and/or therebelow.

In one or more embodiments, the light responsive material comprises an electrochromic material, a photochromic material, a suspended particle material, a micro-blind material, a liquid crystal material or combinations thereof. The light responsive material changes the transmittance of the laminate between an opaque or translucent state and a transparent state. In some embodiments, the appearance state includes an opaque state on one surface of the laminate (e.g., reference numeral 13 in FIG. 1), and a translucent or transparent state on another surface (e.g., reference numeral 19 in FIG. 1.), similar to a two-way mirror. In such embodiments, the electrochromic light responsive materials may provide a reflective surface on one surface of the laminate (e.g., reference numeral 13, FIG. 1), while the opposite surface (e.g., reference numeral 19, FIG. 1) remains translucent or transparent, and thus the appearance state changes between transparent and opaque or mirror-like.

The transparent state may have an average transmittance of 60% or greater over the visible spectrum. The translucent state may have an average transmittance in the range from about 10% up to about 60% over the visible spectrum (i.e., from about 400 nm to about 720 nm). The opaque state may have an average transmittance of less than 10% over the visible spectrum. In some embodiments, the transparent state may have about 60% or greater transmittance over the visible spectrum and an opaque state of about 1% transmittance over the visible spectrum.

In one or more embodiments, the light responsive material may be described as a darkening material. The light responsive material may be used to adjust the amount of light being transmitted through the laminate. Where a display unit is integrated into the laminate or being utilized otherwise, the light responsive material can adjust the light being transmitted through the laminate to the user or viewer to enhance the contrast of the displayed image at a surface of the laminate.

The adjustment between the appearance state can be controlled automatically (e.g., in response to exposure of the display surface to a particular wavelength of light, such as ultraviolet light, or in response to a signal generated by a light detector, such as a photoeye) or manually (e.g., by a viewer). In some instances, the change in appearance state between opaque or translucent and transparent may be actuated by a display unit (as will be described herein) being turned on, which may be combined with additional controls dependent on the amount of ambient light detected and/or a user or viewer's preference. In one or more embodiments, the change in appearance state between the opaque or translucent and transparent may be completed in less than about 10 minutes (e.g., less than about 5 minutes, less than about 2 minutes, or less than about 1 minute), depending on the size of the laminate.

In one or more embodiments, exemplary electrochromic material includes materials that light transmittance properties in response to voltage. Such materials may be disposed as a thin film by known deposition methods including vacuum deposition methods. The material may include $WO_3$, which is colorless until the insertion of hydrogen ($H^+$) or alkali metal atoms (e.g., $Li^+$, $K^+$ or $Na^+$) into interstitial sites of $WO_3$, at which point the material absorbs light and may take on a blue color. Such materials provide a user some degree of control over the transmittance through the material and thus the laminate. In one or more embodiments, the electrochromic material may change from a translucent state to a transparent state and vice versa. In some embodiments, the translucent state may exhibit a color to a viewer, or may be white or black. In such materials, the user actuates electricity to the material to initiate the change between a translucent state and a transparent state. Once the change occurs, electricity is no longer needed to maintain the appearance state.

In one or more embodiments, exemplary photochromic materials include polymeric materials that change color under the influence of multi-color light or a monochromatic light (for example, UV light). Examples include naphthopyrans having a cyclic group annelated in position 6, 7. The photochromic materials may be integral with one or both substrates of the laminate. For example, one or both substrates may be glass and may have a composition that includes any one or more of Ag, Br, Cl and CuO. For example, the glass may include the composition disclosed in U.S. Pat. No. 5,023,209, "Fast fading, high refractive index photochromic glass," which is incorporated by reference herein in its entirety. In other embodiments, the glass includes microcrystalline silver halides. Photochromic glass may be made by fusion processes and/or chemically strengthened, as will be described below. In some embodiments, the photochromic material includes organic molecules (e.g., oxazins and/or naphthopyrans) in plastics or organic materials. The change between opaque or translucent and transparent may be achieved in less than about 5 minutes, less than about 2 minutes or less than about 1 minute. The transparent state may have an average transmittance of about 90% and the opaque or translucent state may have an average transmittance of about 15-20% over the visible spectrum. Photochromic materials are reliant on ambient environment for activation but can be used in combination with the other light responsive materials to provide dual activation (i.e., by a user or by the ambient environment).

Exemplary suspended particle device (SPD) materials include thin films of rod-like nano-scale particles (which may be asymmetrical) that are suspended in a liquid. In some cases, the particles are light-absorbing and disposed in liquid bubbles embedded in a polymer matrix. The suspended particles are randomly oriented when in an inactive state (e.g., when no voltage is applied). The particles block and absorb light when in the inactive state. In the active state (e.g., when voltage is applied), the suspended particles align and permit light pass through the material and thus the laminate. The degree of voltage varies the degree of orientation. In this manner, the change between opaque or translucent and transparent can be varied. To activate the suspended particle device materials, various sensors (including photosensors and motion sensors), user applications and the like may utilized. Suspended particle materials are believed to have a faster change time (e.g., less than 1 minute, less than 30 seconds or less than about 1 second), and thus, may be more useful in automotive applications when the ambient light environment can change quickly and drastically.

Exemplary micro-blind materials control the amount of light passing through in response to applied voltage. In some embodiments, the micro-blind materials may include switchable micro-electro-mechanical (MEMS) mirrors having dimensions that, when in an inactive state, the laminate is transparent, but in an active state, the laminate has an opaque or translucent appearance. The micro-blind materials may be formed using lithography and selective etching to provide the mirrors, which resemble louvers that open and close. More specifically, the micro-blind materials may include a metal layer deposited by known means (e.g., magnetron sputtering). The metal layer may be selectively etched by patterning by laser or lithography process. In some embodiments, a thin layer of a transparent conductive oxide (TCO) may be used along with a thin insulator that is deposited between the metal layer and the TCO layer for electrical disconnection. With no applied voltage, the micro-blinds are configured to permit light to pass through the laminate. The micro-blinds are configured to block or at least partially block light from passing through the laminate when there is a potential difference between the metal layer and the transparent conductive layer.

The micro-blind materials may incorporate an air gap to permit movement, while minimizing deflection of the mirrors. As with the suspended particle device materials, to activate the micro-blind materials, various sensors (including photosensors and motion sensors), user applications and the like may utilized.

Exemplary liquid crystal materials may include polymer dispersed liquid crystal (PDLC) materials. In one or more embodiments, the liquid crystals are dissolved or dispersed into a liquid polymer. The polymer is then solidified and, during this process, the liquid crystals become incompatible with the solid polymer and form droplets throughout the solid polymer. The polymer and liquid crystals may be applied between the first and second substrate while in the liquid state with a thin layer of a transparent, conductive material. The polymer is then solidified. For activation, electrodes from a power supply are attached to the transparent electrodes. The liquid crystals are randomly oriented in the droplets when no voltage is applied, which results in light scattering as light is transmitted through the laminate (i.e., providing the opaque or translucent state). When a voltage is applied to the electrodes, the electric field formed between the two transparent electrodes on the glass causes the liquid crystals to align, permitting light to pass through the droplets with very little scattering and forming a transparent state. In some embodiments, the laminate appears white in the inactive state (when no voltage is applied) due to scattering by the liquid crystals. In some embodiments, a dye-doped polymer may be used to alter the appearance of the laminate when in an inactive state. The dye-doped polymer provides light absorption and a darker color or appearance, while the liquid crystals provide scattering. The degree of transparency can be controlled by the applied voltage. The transparent state may have an average transmittance of about 75% or greater over the visible spectrum. The change between opaque or translucent and transparent can occur quickly (e.g., less than 1 minute, less than 30 seconds, or less than 1 minute).

In some embodiments, the light responsive material that are activated by voltage (i.e., electrochromic materials, PDLC materials, SPD materials and micro-blind materials) utilize a touch user interface that permits a user to apply voltage to select portions of the laminate to activate the light responsive material at the select portion(s). The light responsive material can be segmented so that portions are activated only in response to selective activation by the user (as opposed to the entire laminate changing appearance state when a user touches any portion of the touch user interface).

In some embodiments, the light responsive material darkens by providing absorption but does not provide a high degree of scattering. In some embodiments, a scattering layer may be added to the laminate to provide a surface that can function as a projection surface. The scattering layer may be disposed between the substrates, in front of the laminate with respect to the viewer or behind the laminate with respect to the viewer.

In one or more embodiments, the laminate may include a display unit disposed between the first and second substrate. In some instances, the display unit may be disposed between the interlayer and the second substrate or between the first substrate and the interlayer. In other embodiments, the display unit is integrally formed in one or both of the substrates. In yet other embodiments, the display unit is disposed behind the laminate or in front of the laminate, with respect to the viewer. The display unit may include an image panel comprising any one or more of a micro-LED array, an OLED array, a LCD array, a plasma cell array, and an electroluminescent (EL) cell array. In some embodiments, the display unit may be a projection source that utilizes the scattering surface formed by the light responsive materials or other layers, as described herein.

In one or more embodiments, the interlayer includes a polymer. Exemplary polymer interlayers include materials such as, but not limited to, poly vinyl butyral (PVB), polycarbonate, acoustic PVB, ethylene vinyl acetate (EVA), thermoplastic polyurethane (TPU), ionomer, a thermoplastic material, and combinations thereof. The interlayer may have a thickness of about 2 mm or less (e.g., 1.5 mm or less, or about 1 mm or less) and may include multiple sublayers of various compositions.

In various exemplary and non-limiting embodiments, one or more of the first and second substrate may comprise a glass material (e.g., soda lime glass, alkali aluminosilicate glass, alkali containing borosilicate glass and/or alkali aluminoborosilicate glass), a glass-ceramic material, a polymeric material, and/or a poly-ceramic material. The substrate may, in various embodiments, be provided as a single sheet or as part of a laminate or stacked structure. In exemplary embodiments where a laminate or stacked structure is employed for the substrate, the layers of the substrate may be chosen from the same or different materials, and the layers of the substrate may directly physically contact one another or may be separated from one another by an intervening layer (such as an adhesive layer) or by a gap (e.g., an air gap).

Glass materials used in embodiments of the laminate may be provided using a variety of different processes. For instance, where the glass material may be formed using known forming methods include float glass processes and down-draw processes such as fusion draw and slot draw. In some embodiments, the glass material may be formed from a "phase-separable" glass composition which may undergo phase separation into two or more distinct phases upon exposure to a phase separation treatment, such as a heat treatment or the like, to produce a "phase separated" glass including distinct glass phases having different compositions.

A glass material prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass material that can be lifted from the tin onto rollers. Once off the bath, the glass material can be cooled further and annealed to reduce internal stress.

Down-draw processes produce glass materials having a uniform thickness that possess relatively pristine surfaces. Because the average flexural strength of glass materials is controlled by the amount and size of surface flaws, a pristine surface that has had minimal contact has a higher initial strength. When this high strength glass material is then further strengthened (e.g., chemically or thermally), the resultant strength can be higher than that of a glass material with a surface that has been lapped and polished. Down-drawn glass materials may be drawn to a thickness of less than about 2 mm. In addition, down drawn glass materials have a very flat, smooth surface that can be used in its final application without additional grinding and polishing steps.

The glass material may be formed using a fusion draw process, for example, which uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass material. The fusion draw method offers the advantage that, because the two glass films flowing over the channel fuse together, neither of the outside surfaces of the resulting glass material comes in contact with any part of the apparatus. Thus, the surface properties of the fusion drawn glass material are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous material and into an annealing region.

In some embodiments, the compositions used for the glass may be batched with about 0 mol % to about 2 mol. % of at least one fining agent selected from a group that includes $Na_2SO_4$, NaCl, NaF, NaBr, $K_2SO_4$, KCl, KF, KBr, and $SnO_2$.

Once formed, the glass substrate may be strengthened to form a strengthened glass material. It should be noted that glass-ceramics described herein may also be strengthened in the same manner as glass materials. As used herein, the term "strengthened material" may refer to a glass material or a glass-ceramic material that has been chemically strengthened, for example through ion-exchange of larger ions for smaller ions in the surface of the glass or glass-ceramic material. However, other strengthening methods known in the art, such as thermal tempering, may be utilized to form strengthened glass materials and/or glass-ceramic materials. In some embodiments, the materials may be strengthened using a combination of chemical strengthening processes and thermally strengthening processes.

The strengthened materials described herein may be chemically strengthened by an ion exchange process. In the ion-exchange process, typically by immersion of a glass or glass-ceramic material into a molten salt bath for a predetermined period of time, ions at or near the surface(s) of the glass or glass-ceramic material are exchanged for larger metal ions from the salt bath. In one embodiment, the temperature of the molten salt bath is in the range from about 400° C. to about 430° C. and the predetermined time period is about four to about twenty-four hours; however the temperature and duration of immersion may vary according to the composition of the material and the desired strength attributes. The incorporation of the larger ions into the glass or glass-ceramic material strengthens the material by creating a compressive stress in a near surface region or in regions at and adjacent to the surface(s) of the material. A corresponding tensile stress is induced within a central region or regions at a distance from the surface(s) of the material to balance the compressive stress. Glass or glass-ceramic materials utilizing this strengthening process may be described more specifically as chemically-strengthened or ion-exchanged glass or glass-ceramic materials.

In one example, sodium ions in a strengthened glass or glass-ceramic material are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass-ceramic can be replaced by Ag+ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened material that results in a stress profile. The larger volume of the incoming ion produces a compressive stress (CS) on the surface and tension (central tension, or CT) in the center of the strengthened material. The compressive stress is related to the central tension by the following relationship:

$$CS = CT\left(\frac{t - 2DOL}{DOL}\right)$$

where t is the total thickness of the strengthened glass or glass-ceramic material and compressive depth of layer (DOL) is the depth of exchange. Depth of exchange may be described as the depth within the strengthened glass or glass-ceramic material (i.e., the distance from a surface of the glass material to a central region of the glass or glass-ceramic material), at which ion exchange facilitated by the ion exchange process takes place.

In one embodiment, a strengthened glass or glass-ceramic material can have a surface compressive stress of about 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass or glass-ceramic material may have a compressive depth of layer about 15 μm or greater, 20 μm or greater (e.g., 25 μm, 30 μm, 35 μm, 40 μm, 45 μm, 50 μm or greater) and/or a central tension of about 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass or glass-ceramic material has one or more of the following: a surface compressive stress greater than about 200 MPa, a depth of compressive layer greater than about 15 μm, and a central tension greater than about 18 MPa. In one or more embodiments, the \one or both the first substrate and the second substrate is strengthened, as described herein. In some instances, both the first substrate and the second substrate are strengthened. The first substrate may be chemically strengthened, while the second substrate is thermally strengthened. In some instances, only one of the first substrate and the second substrate are chemically and/or thermally strengthened, while the other is not strengthened.

Example glasses that may be used in the glass material may include alkali aluminosilicate glass compositions or alkali aluminoborosilicate glass compositions, though other glass compositions are contemplated. Such glass compositions may be characterized as ion exchangeable. As used herein, "ion exchangeable" means that a material comprising the composition is capable of exchanging cations located at or near the surface of the material with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the material includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the material can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the material system 110 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq$ (MgO+CaO) $\leq 10$ mol. %.

A still further example glass composition suitable for the glass material comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq$ (MgO+CaO) $\leq 7$ mol. %.

In a particular embodiment, an alkali aluminosilicate glass composition suitable for the glass material comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma \text{modifiers}) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma \text{modifiers}) > 1$.

In still another embodiment, the glass material may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. %

MgO; and 0-5 mol. % CaO, wherein: 66 mol. %≤SiO$_2$+B$_2$O$_3$+CaO≤69 mol. %; Na$_2$O+K$_2$O+B$_2$O$_3$+MgO+CaO+SrO>10 mol. %; 5 mol. %≤MgO+CaO+SrO≤8 mol. %; (Na$_2$O+B$_2$O$_3$)—Al$_2$O$_3$≤2 mol. %; 2 mol. %≤Na$_2$O—Al$_2$O$_3$≤6 mol. %; and 4 mol. %≤(Na$_2$O+K$_2$O)—Al$_2$O$_3$≤10 mol. %.

In an alternative embodiment, the glass material may comprise an alkali aluminosilicate glass composition comprising: 2 mol % or more of Al$_2$O$_3$ and/or ZrO$_2$, or 4 mol % or more of Al$_2$O$_3$ and/or ZrO$_2$.

In some embodiments, the material system 110 may comprise a glass-ceramic material that may be fusion-formed or formed by other known methods such as rolling, thin-rolling, slot draw or float.

Exemplary glass-ceramics that may be used in various embodiments of the material system 110 may be characterized by the processes by which they can be formed. Such glass-ceramics may be formed by float processes, fusion processes, slot draw process, thin rolling processes, or a combination thereof. Some glass-ceramics tend to have liquidus viscosities that preclude the use of high throughput forming methods such as float, slot draw, or fusion draw. For example, some known glass-ceramics are formed from precursor glasses having liquidus viscosities of about 10 kP, which are not suitable for fusion draw, where liquidus viscosities of above about 100 kP or above about 200 kP are generally required. Glass-ceramics formed by the low throughput forming methods (e.g., thin rolling) may exhibit enhanced opacity, various degrees of translucency, and/or surface luster. Glass-ceramics formed by high throughout methods (e.g., float, slot draw, or fusion draw) can achieve very thin layers. Glass-ceramics formed by fusion draw methods may achieve pristine surfaces and thinness (e.g., about 2 mm or less). Examples of suitable glass-ceramics may include Li$_2$O—Al$_2$O$_3$—SiO$_2$ system (i.e. LAS-System) glass-ceramics, MgO—Al$_2$O$_3$—SiO$_2$ system (i.e. MAS-System) glass-ceramics, glass-ceramics including crystalline phases of any one or more of mullite, spinel, α-quartz, β-quartz solid solution, petalite, lithium disilicate, β-spodumene, nepheline, and alumina, and combinations thereof.

In one or more embodiments, one or both the first and second substrate comprise a thickness of about 3 mm or less. In some instances, one of the first and the second substrate has a thickness of about 1 mm to about 3 mm (e.g., from about 1 mm to about 2.8 mm, from about 1 mm to about 2.6 mm, from about 1 mm to about 2.5 mm, from about 1 mm to about 2.4 mm, from about 1 mm to about 2.1 mm, from about 1 mm to about 2 mm, from about 1 mm to about 1.8 mm, from about 1 mm to about 1.6 mm, from about 1 mm to about 1.4 mm, from about 1.2 mm to about 3 mm, from about 1.4 mm to about 3 mm, from about 1.6 mm to about 3 mm, or from about 1.8 mm to about 3 mm), and the other of the first and the second substrate has a thickness of less than 1 mm (e.g., about 0.9 mm or less, about 0.8 mm or less, about 0.7 mm or less, about 0.5 mm or less, about 0.55 mm or less, about 0.4 mm or less, about 0.3 mm or less, or about 0.2 mm or less). The combination of thicknesses for the first substrate and the second substrate may include but are not limited to 2.1 mm/0.7 mm, 2.1 mm/0.5 mm, 1.8 mm/0.7 mm, 1.8 mm/0.5 mm, 1.6 mm/0.5 mm, 1 mm/0.7 mm, and 1 mm/0.5 mm.

In one or more embodiments, the laminate may have a complexly curved shape. As used herein, "complex curve", "complexly curved", "complex curved substrate" and "complexly curved substrate" mean a non-planar shape having compound curves, also referred to as non-developable shapes, which include but are not limited to a spherical surface, an aspherical surface, and a toroidal surface, where the curvature of two orthogonal axes (horizontal and vertical one) are different, which may be for example a toroidal shape, an oblate spheroid, oblate ellipsoid, prolate spheroid, prolate ellipsoid, or where the surface's principle curvature along two orthogonal planes are opposite, for example a saddle shape or surface, such as a horse or monkey saddle. Other examples of a complex curves include, but are not limited to, an elliptic hyperboloid, a hyperbolic paraboloid, and a spherocylindrical surface, where the complex curves may have constant or varying radii of curvature. The complex curve may also include segments or portions of such surfaces, or be comprised of a combination of such curves and surfaces. In one or more embodiments, a laminate may have a compound curve including a major radius and a cross curvature. The curvature of the laminate can be even more complex when a significant minimum radius is combined with a significant cross curvature, and/or depth of bend. Some laminates may also require bending along axes of bending that are not perpendicular to the longitudinal axis of the flat glass substrate.

In one or more embodiment, the laminate may have radii of curvature along two orthogonal axes. In various embodiments, the laminate may be asymmetrical. Some laminates may also include bending along axes that are not perpendicular to the longitudinal axis of the substrates, prior to forming (i.e., a flat surface or flat substrate).

In one or more embodiment, the radii of curvature may be less than 1000 mm, or less than 750 mm, or less than 500 mm, or less than 300 mm. In various embodiments, the laminate is substantially free of wrinkles or optical distortions, including at the edges of the laminate.

In one or more embodiments, the laminate may be characterized as a cold-formed laminate. In such embodiments, the laminate includes first curved substrate and a substantially planar second substrate, wherein the second substrate is cold formed to the curvature of the first substrate.

As used herein, cold form includes a forming process in which the substrates and/or the laminate is formed at a temperature less than the softening temperature of the first and second substrates to provide a complexly curved laminate.

Embodiments of the cold formed laminate may include at least one interlayer and at least one light responsive material, as both described herein, disposed between the first and second substrate. In some embodiments, the light responsive material may be integral to one or both substrates. In some instances, the cold formed laminate may include a display unit as described herein. In one or more embodiments, the second substrate is strengthened by forming to the curvature of the first substrate. The cold-formed laminate may be complexly curved as described herein.

Figure 3:
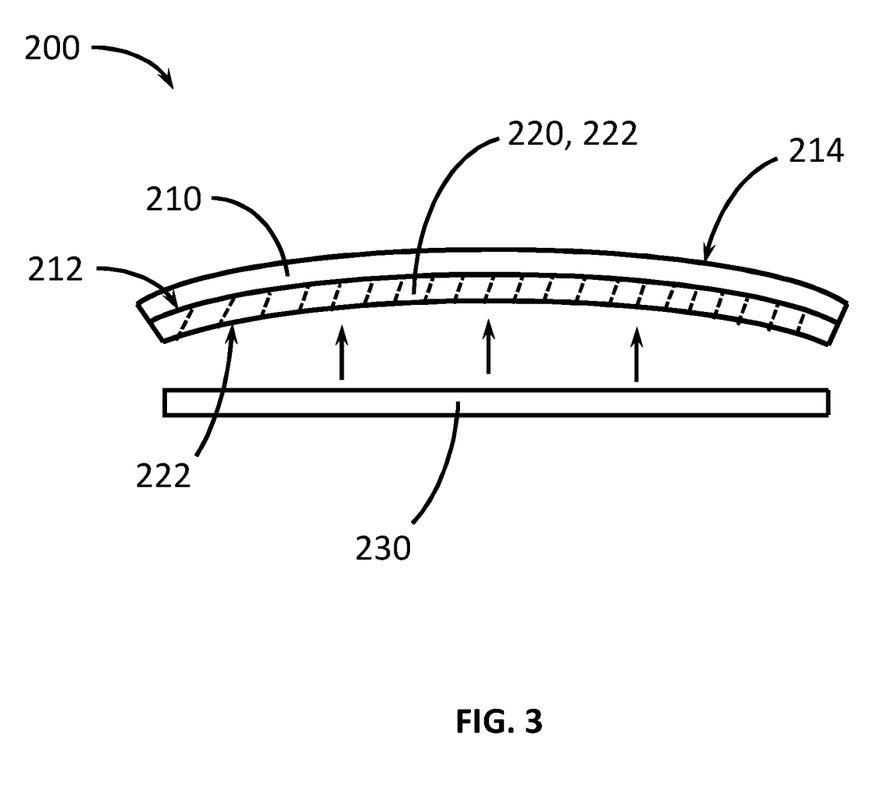
FIG. 3 is a side view of a cold formed laminate prior to formation according to one or more embodiments.
Figure 4:
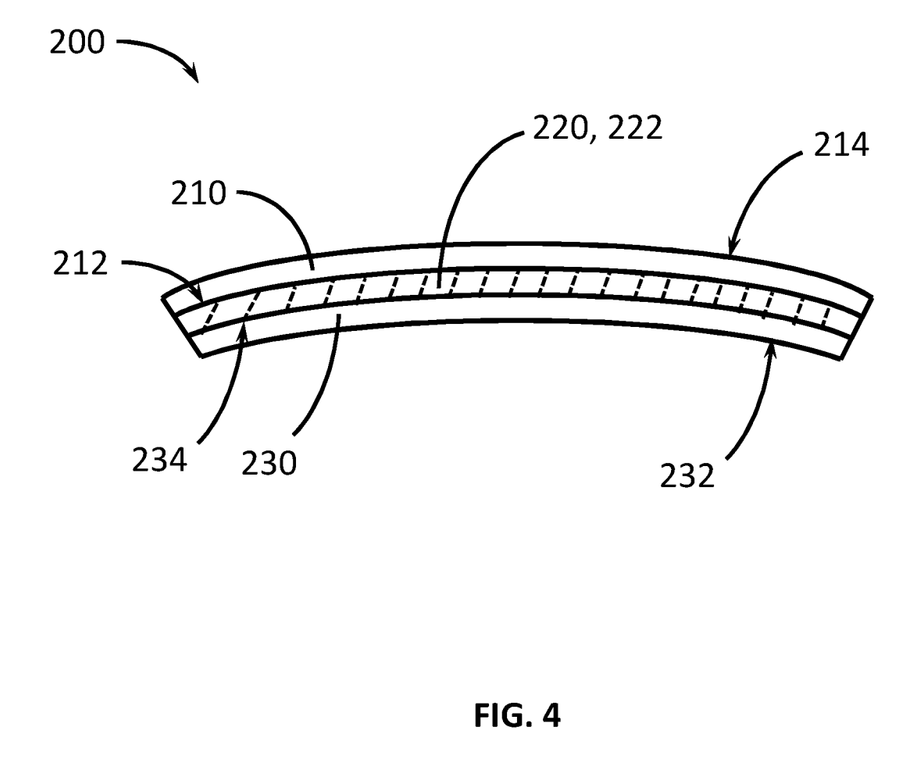
FIG. 4 is a side view of the cold formed laminate shown in FIG. 4.

Referring to FIGS. 3 and 4, in an exemplary cold forming method, a flat substrate 230 can be laminated to a curved substrate 210, which may be complexly curved. In one or more embodiments, the complexly-curved substrate 210 has a convex surface 214 and a concave surface 212. The interlayer 220 may function as a bonding layer 220 when applied to the concave surface 212 leaving an exposed concave surface 222 to bond with the flat substrate 230. In other embodiments, the flat substrate 230 is formed to the curved substrate 210 without the interlayer 220 and the two separate substrates with the same curvature are then bonded to the interlayer 220 in a separate step. In various embodiments, the flat substrate 230 may be pressed against the exposed concave surface 222 of bonding layer 220, where the flat substrate 230 deforms to take on the shape of curved substrate 210. The resulting laminate is complexly curved.

The laminates described herein may be utilized in vehicles such as automobiles, boats, and airplanes (e.g., glazing such as windshields, windows or sidelites, mirrors, pillars, side panels of a door, headrests, dashboards, consoles, or seats of the vehicle, or any portions thereof), architectural fixtures or structures (e.g., internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, tablets, and music players), furniture, information kiosks, retail kiosks, and the like.

A second aspect of this disclosure pertains to a method of forming a laminate. In one or more embodiments, the method includes providing a first substrate and a second substrate, laminating the first and second substrates to at least one interlayer and at least one light responsive material to form a laminate such that the interlayer and the light responsive material are disposed between the first and second substrate, and shaping the laminate to a complex curved shape. In some embodiments, the light responsive material is integral to one or both substrates and thus, the method includes laminating the substrates to the at least one interlayer. In one or more embodiments, the method includes strengthening one or both of the substrates, as described herein. In one or more embodiments, shaping the laminate to a complexly curved shape includes heating the laminate or the individual substrates in a lehr that is comprised of a number of furnaces arranged in series in which the temperature of the laminate or substrate(s) is gradually raised to accomplish sagging under gravity. Systems for shaping the laminate and/or substrate(s) can include a shaping mold, a radiation heating source, and a radiation shield, wherein the radiation shield is positioned substantially between the radiation heating source and the laminate and/or substrate(s).

In one or more embodiments, the method includes cold forming a laminate. The method includes providing a curved first substrate, a substantially planar second substrate, at least one polymer interlayer and at least one light responsive material between the first and second substrate, and laminating the first substrate, second substrate, polymer interlayer and light responsive material together at a temperature less than the softening temperature of the first and second substrates to provide a complexly curved laminate. In one or more embodiments, laminating includes forming the second substrate to the curved shape of the first substrate. In some embodiments, the light responsive material is integral to the substrates and thus, the method includes providing a curved first substrate, a substantially planar second substrate, and at least one polymer interlayer between the first and second substrate, and laminating the first substrate, second substrate, and polymer interlayer together at a temperature less than the softening temperature of the first and second substrates to provide a complexly curved laminate.

In some instances, the interlayer is laminated to the substrates as a separate step, and thus, the method includes laminating the curved first substrate and the planar second substrate together at a temperature less than the softening temperature of the first and second substrates to provide two complexly curved substrates, which are then laminated to the interlayer and optionally the light responsive material to provide a laminate that is complexly curved.

It will be apparent to those skilled in the art that various modifications and variations can be made without departing from the spirit or scope of the invention.

What is claimed is:

1. A laminate comprising
a first substrate;
an interlayer disposed on the first substrate; and
a second substrate disposed on the interlayer,
wherein the laminate is complexly curved and comprises, as two separate components:
a light responsive material; and
a display unit.

2. The laminate of claim 1, wherein the light responsive material is disposed between the first substrate and the second substrate, or integral to one or both the first substrate and the second substrate.

3. The laminate of claim 1, wherein the light responsive material comprises any one or more of an electrochromic material, a photochromic material, a suspended particle material, a micro-blind material and a liquid crystal material.

4. The laminate of claim 1, wherein the display unit is:
disposed between the first substrate and second substrate,
integral to one or both the first substrate and the second substrate, or
disposed behind the laminate with respect to a user.

5. The laminate of claim 4, wherein the display unit comprises an image panel comprising any one or more of a micro-LED array, an OLED array, a LCD array, a plasma cell array, and an electroluminescent (EL) cell array.

6. The laminate of claim 1, wherein the interlayer comprises a polymer and either one or both of the first substrate and the second substrate is strengthened.

7. The laminate of claim 1, wherein the first substrate is strengthened and comprises first and second surfaces, the second surface being adjacent the interlayer, and the second substrate comprises third and fourth surfaces, the third surface being adjacent the interlayer and the fourth surface being opposite the third surface.

8. The laminate of claim 7, wherein the first surface comprises a surface compressive stress of greater than about 200 MPa and a depth of layer of compressive stress of greater than about 30 μm.

9. The laminate of claim 1, wherein either one or both the first and second substrate comprise a thickness of about 1.5 mm or less.

10. The laminate of claim 6, wherein the strengthened substrate comprises a thickness of about 1.0 mm or less.

11. The laminate of claim 1, wherein the interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, and combinations thereof.

12. The laminate structure of claim 1, wherein the thickness of the interlayer is less than about 1 mm.

13. An article comprising the laminate of claim 1, wherein the article comprises any one of a vehicle, an architectural fixture, an architectural structure, an appliance a consumer electronic device, furniture, an information kiosk, and a retail kiosk.

14. A laminate comprising:
a complexly curved first substrate;
a substantially planar second substrate;
at least one interlayer intermediate the first substrate and the second substrate;
a display unit; and at least one light responsive material that is separate from the display unit,
wherein the second substrate is cold formed to the curvature of the first substrate, and
wherein the light responsive material is disposed between the first substrate and the second substrate or integral to one or both the first substrate and the second substrate.

15. The laminate of claim 14, wherein the display unit is disposed between the first substrate and the second substrate, integral to one or both the first substrate and the second substrate, or disposed behind the laminate with respect to a viewer.

16. The laminate of claim 14, wherein one or both of the first substrate and the second substrate are chemically, thermally strengthened or chemically and thermally strengthened.

17. The laminate of claim 14, wherein the second substrate has a thickness of about 1 mm or less.

18. The laminate of claim 14, wherein the light responsive material comprises any one or more of an electrochromic material, a photochromic material, a suspended particle material, a micro-blind material and a liquid crystal material.

19. A method of cold forming a laminate comprising:
laminating a complexly curved first substrate and a substantially planar second substrate together at a temperature less than the softening temperature of the first and second substrates to provide a complexly curved second substrate; and
laminating the complexly curved first substrate and complexly curved second substrate to at least one polymer interlayer that is disposed between the first and second substrate to provide a complexly curved laminate,
wherein complexly curved laminate comprises, as two separate components:
a light responsive material; and
a display unit.

20. The method of claim 19, wherein laminating the complexly curved first substrate and complexly curved second substrate to at least one polymer interlayer comprises disposing the light responsive material between the first and second substrate prior to lamination.

* * * * *